(12) United States Patent
Tremblay et al.

(10) Patent No.: US 7,089,374 B2
(45) Date of Patent: Aug. 8, 2006

(54) SELECTIVELY UNMARKING LOAD-MARKED CACHE LINES DURING TRANSACTIONAL PROGRAM EXECUTION

(75) Inventors: Marc Tremblay, Menlo Park, CA (US); Quinn A. Jacobson, Sunnyvale, CA (US); Shailender Chaudhry, San Francisco, CA (US); Mark S. Moir, Somerville, MA (US); Maurice P. Herlihy, Brookline, MA (US)

(73) Assignee: SUN Microsystems, Inc., Santa Clara, CA (US)

( * ) Notice: Subject to any disclaimer, the term of this patent is extended or adjusted under 35 U.S.C. 154(b) by 302 days.

(21) Appl. No.: 10/764,412

(22) Filed: Jan. 23, 2004

(65) Prior Publication Data

US 2004/0187123 A1    Sep. 23, 2004

Related U.S. Application Data

(60) Provisional application No. 60/447,128, filed on Feb. 13, 2003.

(51) Int. Cl.
   *G06F 12/00* (2006.01)

(52) U.S. Cl. ............... 711/145; 711/130; 711/143; 711/144; 711/150; 711/151; 711/156; 711/158

(58) Field of Classification Search ............ 711/130, 711/143–145, 150–151, 156, 158
See application file for complete search history.

(56) References Cited

U.S. PATENT DOCUMENTS

| | | | | |
|---|---|---|---|---|
| 5,701,432 A | * | 12/1997 | Wong et al. ............... | 711/130 |
| 5,974,438 A | * | 10/1999 | Neufeld ..................... | 718/104 |
| 6,021,480 A | * | 2/2000 | Pettey ....................... | 711/201 |
| 6,360,220 B1 | * | 3/2002 | Forin ........................ | 707/8 |
| 6,918,012 B1 | * | 7/2005 | Venkitakrishnan et al. . | 711/145 |
| 2003/0066056 A1 | * | 4/2003 | Petersen et al. ........... | 717/137 |
| 2003/0079094 A1 | * | 4/2003 | Rajwar et al. ............. | 711/150 |
| 2004/0162948 A1 | * | 8/2004 | Tremblay et al. .......... | 711/137 |

* cited by examiner

*Primary Examiner*—Matthew Kim
*Assistant Examiner*—Hetul Patel
(74) *Attorney, Agent, or Firm*—Park, Vaughan & Fleming, LLP

(57) ABSTRACT

One embodiment of the present invention provides a system that facilitates selectively unmarking load-marked cache lines during transactional program execution, wherein load-marked cache lines are monitored during transactional execution to detect interfering accesses from other threads. During operation, the system encounters a release instruction during transactional execution of a block of instructions. In response to the release instruction, the system modifies the state of cache lines, which are specially load-marked to indicate they can be released from monitoring, to account for the release instruction being encountered. In doing so, the system can potentially cause the specially load-marked cache lines to become unmarked. In a variation on this embodiment, upon encountering a commit-and-start-new-transaction instruction, the system modifies load-marked cache lines to account for the commit-and-start-new-transaction instruction being encountered. In doing so, the system causes normally load-marked cache lines to become unmarked, while other specially load-marked cache lines may remain load-marked past the commit-and-start-new-transaction instruction.

28 Claims, 10 Drawing Sheets

| OLD VERSION | NEW VERSION |
|---|---|
| ⋮ | ⋮ |
| ACQUIRE LOCK | STE     <FAIL PC> |
| ⋮ | ⋮ |
| CRITICAL SECTION  | CRITICAL SECTION |
| ⋮ | ⋮ |
| RELEASE LOCK | COMMIT |
| ⋮ | ⋮ |

OLD VERSION          NEW VERSION

• • •                • • •

ACQUIRE LOCK         STE         <FAIL PC>

┌─────────────────────┐
                    │ READ LOCK STATE     │
                    │ TRANSACTIONALLY     │
                    │ AND CHECK THAT      │
                    │ LOCK IS NOT HELD    │
                    └─────────────────────┘

• • •    • • •

RELEASE LOCK         COMMIT

• • •                • • •

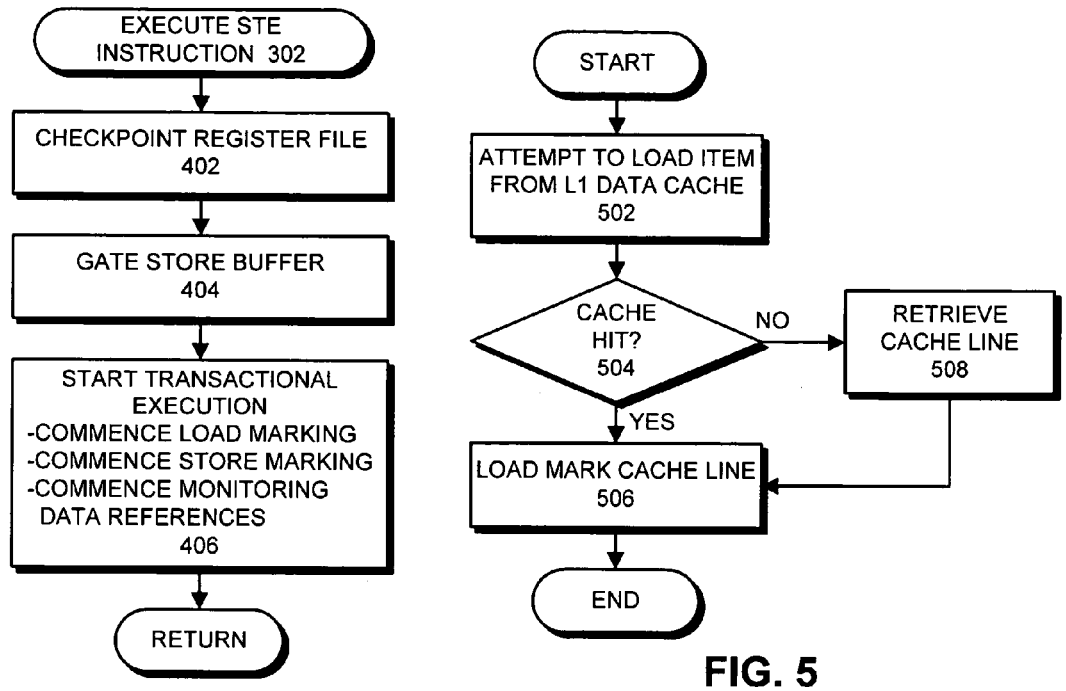
FIG. 4
FIG. 5
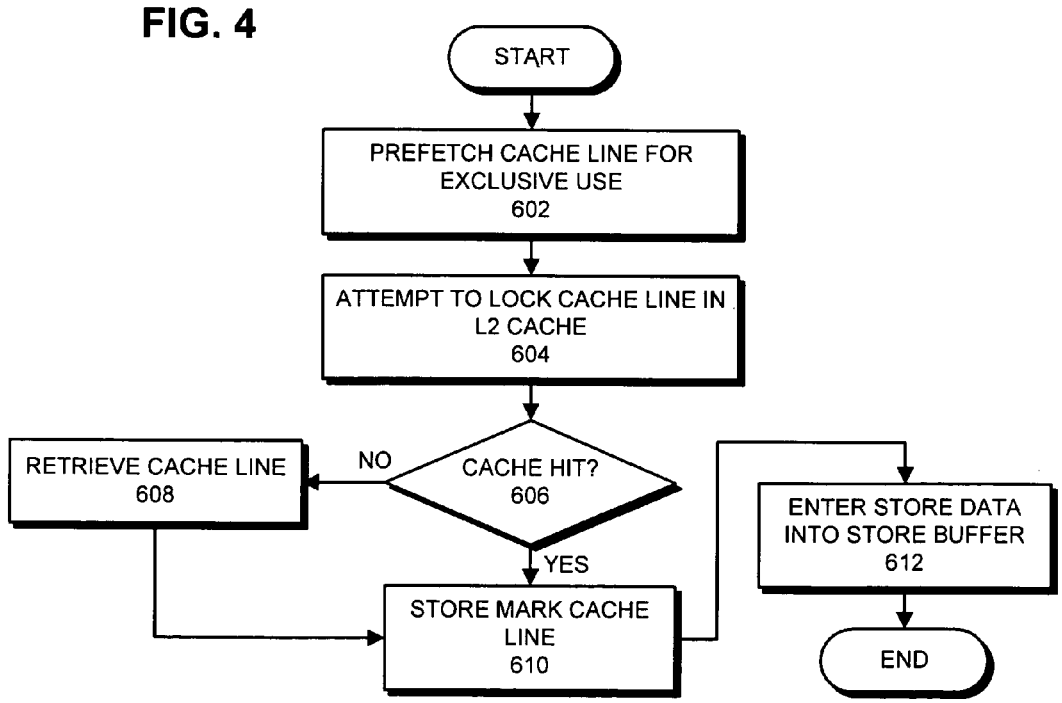
FIG. 6

US 7,089,374 B2

SELECTIVELY UNMARKING LOAD-MARKED CACHE LINES DURING TRANSACTIONAL PROGRAM EXECUTION

RELATED APPLICATION

This application hereby claims priority under 35 U.S.C. §119 to U.S. Provisional Patent Application No. 60/447,128, filed on 13 Feb. 2003, entitled "Transactional Memory," by inventors Shailender Chaudhry, Marc Tremblay and Quinn Jacobson.

The subject matter of this application is additionally related to the subject matter in a co-pending non-provisional U.S. patent application by inventors Marc Tremblay, Quinn A. Jacobson and Shailender Chaudhry, entitled, "Selectively Monitoring Loads to Support Transactional Program Execution," having Ser. No. 10/637,168, and filing date 8 Aug. 2003.

BACKGROUND

1. Field of the Invention

The present invention relates to techniques for improving the performance of computer systems. More specifically, the present invention relates to a method and an apparatus for selectively unmarking load-marked cache lines during transactional program execution.

2. Related Art

Computer system designers are presently developing mechanisms to support multi-threading within the latest generation of Chip-Multiprocessors (CMPs) as well as more traditional Shared Memory Multiprocessors (SMPs). With proper hardware support, multi-threading can dramatically increase the performance of numerous applications. However, as microprocessor performance continues to increase, the time spent synchronizing between threads (processes) is becoming a large fraction of overall execution time. In fact, as multi-threaded applications begin to use even more threads, this synchronization overhead becomes the dominant factor in limiting application performance.

From a programmer's perspective, synchronization is generally accomplished through the use of locks. A lock is typically acquired before a thread enters a critical section of code, and is released after the thread exits the critical section. If another thread wants to enter a critical section protected by the same lock, it must acquire the same lock. If it is unable to acquire the lock, because a preceding thread has grabbed the lock, the thread must wait until the preceding thread releases the lock. (Note that a lock can be implemented in a number of ways, such as through atomic operations or semaphores.)

Unfortunately, the process of acquiring a lock and the process of releasing a lock are very time-consuming in modern microprocessors. They involve atomic operations, which typically flush the load buffer and store buffer, and can consequently require hundreds, if not thousands, of processor cycles to complete.

Moreover, as multi-threaded applications use more threads, more locks are required. For example, if multiple threads need to access a shared data structure, it is impractical for performance reasons to use a single lock for the entire data structure. Instead, it is preferable to use multiple fine-grained locks to lock small portions of the data structure. This allows multiple threads to operate on different portions of the data structure in parallel. However, it also requires a single thread to acquire and release multiple locks in order to access different portions of the data structure. It also introduces significant software engineering concerns, such as avoiding deadlock.

In some cases, locks are used when they are not required. For example, many applications make use of "thread-safe" library routines that use locks to ensure that they are "thread-safe" for multi-threaded applications. Unfortunately, the overhead involved in acquiring and releasing these locks is still incurred, even when the thread-safe library routines are called by a single-threaded application.

Applications typically use locks to ensure mutual exclusion within critical sections of code. However, in many cases threads will not interfere with each other, even if they are allowed to execute a critical section simultaneously. In these cases, mutual exclusion is used to prevent the unlikely case in which threads actually interfere with each other. Consequently, in these cases, the overhead involved in acquiring and releasing locks is largely wasted.

Hence, what is needed is a method and an apparatus that reduces the overhead involved in manipulating locks when accessing critical sections.

One technique to reduce the overhead involved in manipulating locks is to "transactionally" execute a critical section, wherein changes made during the transactional execution are not committed to the architectural state of the processor until the transactional execution completes without encountering an interfering data access from another thread. This technique is described in related U.S. patent application Ser. No. 10/637,168, entitled, "Selectively Monitoring Loads to Support Transactional Program Execution," by inventors Marc Tremblay, Quinn A. Jacobson and Shailender Chaudhry, filed on 8 Aug. 2003. Note that committing changes can involve, for example, committing store buffer entries to the memory system by ungating the store buffer.

During transactional execution, load and store operations are modified so that they mark cache lines that are accessed during the transactional execution. This allows the computer system to determine if an interfering data access occurs during the transactional execution. If so, the transactional execution fails, and results of the transactional execution are not committed to the architectural state of the processor. One the other hand, if the transactional execution is successful in executing a block of instructions, results of the transactional execution are atomically committed to the architectural state of the processor.

Unfortunately, existing designs for systems that support transactional execution require the hardware to maintain state information about every memory location accessed by the transaction until the transaction completes. Because the hardware resources needed to maintain such state are necessarily bounded, this renders such designs inapplicable to larger transactions that can potentially access a large number of memory locations. For example, a non-blocking implementation of a dynamically sized data structure (such as a linked list) can potentially need to access a large number memory locations during a single atomic transaction (for example, to scan down the linked list). Hence, what is needed is a method and an apparatus that reduces the amount of state information that the system needs to keep track of during transactional program execution.

Unfortunately, problems can arise while marking cache lines. If a large number of lines are marked, false failures are likely to occur when accesses that appear to interfere with each other do not actually touch the same data items in a cache line. Furthermore, the marked cache lines cannot be easily moved out of cache until the transactional execution completes, which also causes performance problems.

Also, since store operations need to be buffered during transactional execution, transactional execution will sometimes be limited by the number of available store buffers on the processor.

Hence, what is needed is a method and an apparatus that reduces the number of cache lines that need to be marked during transactional program execution.

SUMMARY

One embodiment of the present invention provides a system that facilitates selectively unmarking load-marked cache lines during transactional program execution, wherein load-marked cache lines are monitored during transactional execution to detect interfering accesses from other threads. During operation, the system encounters a release instruction during transactional execution of a block of instructions, wherein changes made during the transactional execution are not committed to the architectural state of the processor until the transactional execution completes without encountering an interfering data access from another thread. In response to the release instruction, the system modifies the state of cache lines, which are specially load-marked to indicate they can be released from monitoring, to account for the release instruction being encountered. In doing so, the system can potentially cause the specially load-marked cache lines to become unmarked.

In a variation on this embodiment, a specially load-marked cache line contains a release value indicating how many release instructions need to be encountered before the cache line can become unmarked. In this embodiment, modifying the specially load-marked cache line involves decrementing the release value, wherein if the release value becomes zero, the cache line becomes unmarked.

In a variation on this embodiment, when the system encounters a load instruction during the transactional execution, the system performs the corresponding load operation. If the load instruction is a monitored load instruction, the system also load-marks a corresponding cache line to facilitate subsequent detection of an interfering data access to the cache line from another thread. If the load instruction additionally specifies that the corresponding cache line can be released from monitoring during transactional execution, the system specially load-marks the cache line to indicate that the cache line can be released from monitoring after either an explicit or implicit number of release instructions have been encountered.

In a variation on this embodiment, if an interfering data access from another thread is encountered during transactional execution, the system discards changes made during the transactional execution, and attempts to re-execute the block of instructions.

In a variation on this embodiment, if transactional execution completes without encountering an interfering data access from another thread, the system commits changes made during the transactional execution to the architectural state of a processor, and resumes normal non-transactional execution of the program past the block of instructions.

In a variation on this embodiment, an interfering data access (which can potentially cause an eviction of a marked line from cache, and thus a failure of a transaction) can include a store by another thread to a cache line that has been load-marked by a thread, or a load or a store by another thread to a cache line that has been store-marked by the thread.

One embodiment of the present invention provides a system that selectively unmarks load-marked cache lines during transactional program execution, wherein load-marked cache lines are monitored during transactional execution to detect interfering accesses from other threads. During operation, the system encounters a commit-and-start-new-transaction instruction during transactional execution of a block of instructions within a program. In response to the commit-and-start-new-transaction instruction, the system modifies load-marked cache lines to account for the commit-and-start-new-transaction instruction being encountered. In doing so, the system causes normally load-marked cache lines to become unmarked, while other specially load-marked cache lines remain load-marked past the commit-and-start-new-transaction instruction.

In a variation on this embodiment, a specially load-marked cache line contains a checkpoint value indicating how many checkpoint-and-commit instructions need to be encountered before the cache line can become unmarked. In this variation, modifying the specially load-marked cache line involves decrementing the checkpoint value, wherein if the checkpoint value becomes zero, the cache line becomes unmarked.

In a variation on this embodiment, when the system encounters a load instruction during the transactional execution, the system performs the corresponding load operation. If the load instruction is a monitored load instruction, the system also load-marks a corresponding cache line to facilitate subsequent detection of an interfering data access to the cache line from another thread. If the load instruction additionally specifies that multiple checkpoint-and-commit instructions need to be encountered before the cache line can become unmarked, the system specially load-marks the cache line to indicate that multiple checkpoint-and-commit instructions need to be encountered before the cache line can become unmarked.

BRIEF DESCRIPTION OF THE FIGURES

FIG. 4 presents a flow chart illustrating a start transactional execution (STE) operation in accordance with an embodiment of the present invention.

FIG. 5 presents a flow chart illustrating how load-marking is performed during transactional execution in accordance with an embodiment of the present invention.

FIG. 6 presents a flow chart illustrating how store-marking is performed during transactional execution in accordance with an embodiment of the present invention.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

The data structures and code described in this detailed description are typically stored on a computer readable storage medium, which may be any device or medium that can store code and/or data for use by a computer system. This includes, but is not limited to, magnetic and optical storage devices such as disk drives, magnetic tape, CDs (compact discs) and DVDs (digital versatile discs or digital video discs), and computer instruction signals embodied in a transmission medium (with or without a carrier wave upon which the signals are modulated). For example, the transmission medium may include a communications network, such as the Internet.

Computer System

Figure 1:
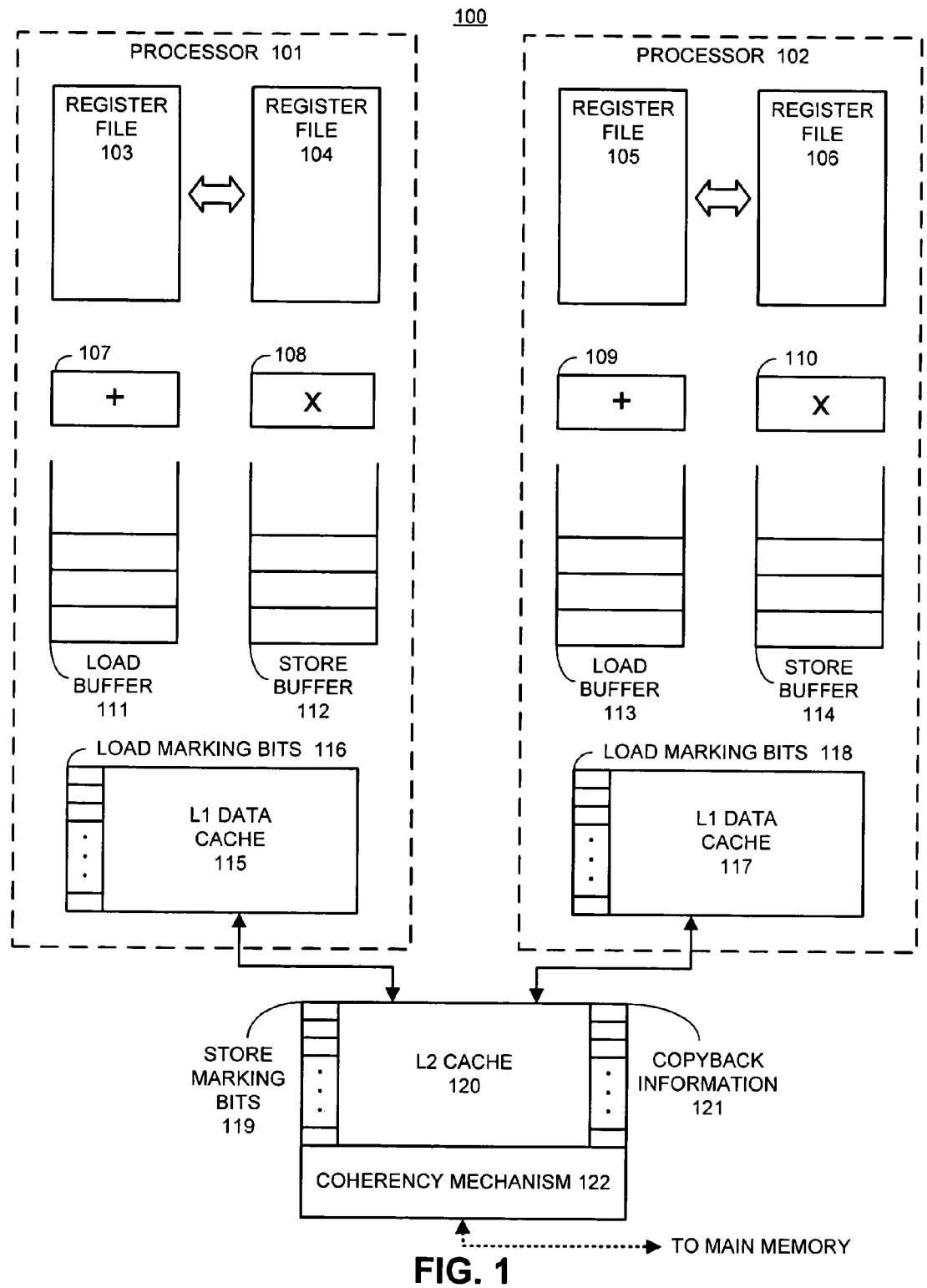
FIG. 1 illustrates a computer system in accordance with an embodiment of the present invention.

FIG. 1 illustrates a computer system 100 in accordance with an embodiment of the present invention. Computer system 100 can generally include any type of computer system, including, but not limited to, a computer system based on a microprocessor, a mainframe computer, a digital signal processor, a portable computing device, a personal organizer, a device controller, and a computational engine within an appliance. As is illustrated in FIG. 1, computer system 100 includes processors 101 and level 2 (L2) cache 120, which is coupled to main memory (not shown). Processor 102 is similar in structure to processor 101, so only processor 101 is described below.

Processor 101 has two register files 103 and 104, one of which is an "active register file" and the other of which is a backup "shadow register file." In one embodiment of the present invention, processor 101 provides a flash copy operation that instantly copies all of the values from register file 103 into register file 104. This facilitates a rapid register checkpointing operation to support transactional execution.

Processor 101 also includes one or more functional units, such as adder 107 and multiplier 108. These functional units are used in performing computational operations involving operands retrieved from register files 103 or 104. As in a conventional processor, load and store operations pass through load buffer 111 and store buffer 112.

Processor 101 additionally includes a level one (L1) data cache 115, which stores data items that are likely to be used by processor 101. Note that lines in L1 data cache 115 include load-marking bits 116, which indicate that a data value from the line has been loaded during transactional execution. These load-marking bits 116 are used to determine whether any interfering memory references take place during transactional execution as is described below with reference to FIGS. 3–8. Processor 101 also includes an L1 instruction cache (not shown).

Note that load-marking does not necessarily have to take place in L1 data cache 115. In general load-marking can take place at any level cache, such as L2 cache 120, or even in an independent structure. However, for performance reasons, the load-marking will likely take place at the cache level that is as close to the processor as possible, which in this case is L1 data cache 115. Otherwise, loads would have to go to L2 cache 120 even on an L1 hit.

L2 cache 120 operates in concert with L1 data cache 115 (and a corresponding L1 instruction cache) in processor 101, and with L1 data cache 117 (and a corresponding L1 instruction cache) in processor 102. Note that L2 cache 120 is associated with a coherency mechanism 122, such as the reverse directory structure described in U.S. patent application Ser. No. 10/186,118, entitled, "Method and Apparatus for Facilitating Speculative Loads in a Multiprocessor System," filed on Jun. 26, 2002, by inventors Shailender Chaudhry and Marc Tremblay (Publication No. US-2002-0199066-A1). This coherency mechanism 122 maintains "copyback information" 121 for each cache line. This copyback information 121 facilitates sending a cache line from L2 cache 120 to a requesting processor in cases where a cache line must be sent to another processor.

Each line in L2 cache 120 includes a "store-marking bit," which indicates that a data value has been stored to the line during transactional execution. This store-marking bit is used to determine whether any interfering memory references take place during transactional execution as is described below with reference to FIGS. 3–8. Note that store-marking does not necessarily have to take place in L2 cache 120.

Ideally, the store-marking takes place in the cache level closest to the processor where cache lines are coherent. For write-through L1 data caches, writes are automatically propagated to L2 cache 120. However, if an L1 data cache is a write-back cache, we perform store-marking in the L1 data cache. (Note that the cache coherence protocol ensures that any other processor that subsequently modifies the same cache line will retrieve the cache line from the L1 cache, and will hence become aware of the store-mark.)

Executing a Critical Section

Figure 2A:
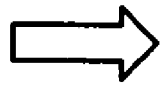
FIG. 2A illustrates how a critical section is executed in accordance with an embodiment of the present invention.

FIG. 2A illustrates how a critical section is executed in accordance with an embodiment of the present invention. As is illustrated in the left-hand side of FIG. 2A, a thread that executes a critical section typically acquires a lock associated with the critical section before entering the critical section. If the lock has been acquired by another thread, the thread may have to wait until the other thread releases the lock. Upon leaving the critical section, the thread releases the lock. (Note that the terms "thread" and "process" are used interchangeably throughout this specification.)

A lock can be associated with a shared data structure. For example, before accessing a shared data structure, a thread can acquire a lock on the shared data structure. The thread can then execute a critical section of code that accesses the shared data structure. After the thread is finished accessing the shared data structure, the thread releases the lock.

In contrast, in the present invention, the thread does not acquire a lock, but instead executes a start transactional execution (STE) instruction before entering the critical section. If the critical section is successfully completed without interference from other threads, the thread performs a commit operation, to commit changes made during transactional execution. This sequence of events is described in more detail below with reference to FIGS. 3–8.

Figure 2B:
FIG. 2B illustrates another example of how a critical section is executed in accordance with an embodiment of the present invention.

Note that in one embodiment of the present invention a compiler replaces lock-acquiring instructions with STE instructions, and also replaces corresponding lock releasing instructions with commit instructions. Note that there may not be a one-to-one correspondence between replaced instructions. For example, a single lock acquisition operation comprised of multiple instructions may be replaced by a single STE instruction (see FIG. 2B).

Note that in many cases we will want to maintain the ability to fall back on the lock in case we cannot make progress for some reason. Also, from a software engineering standpoint, it will often be desirable to transform the code only in common paths, and leave locking code intact in uncommon paths. To facilitate this, in transforming one critical section to execute transactionally, we can replace the lock-acquire with an STE instruction followed by code that reads the lock state transactionally and checks that the lock is not held.

The above discussion presumes that the processor's instruction set has been augmented to include an STE instruction and a commit instruction. These instructions are described in more detail below with reference to FIGS. 3–9.

Transactional Execution Process

Figure 3:
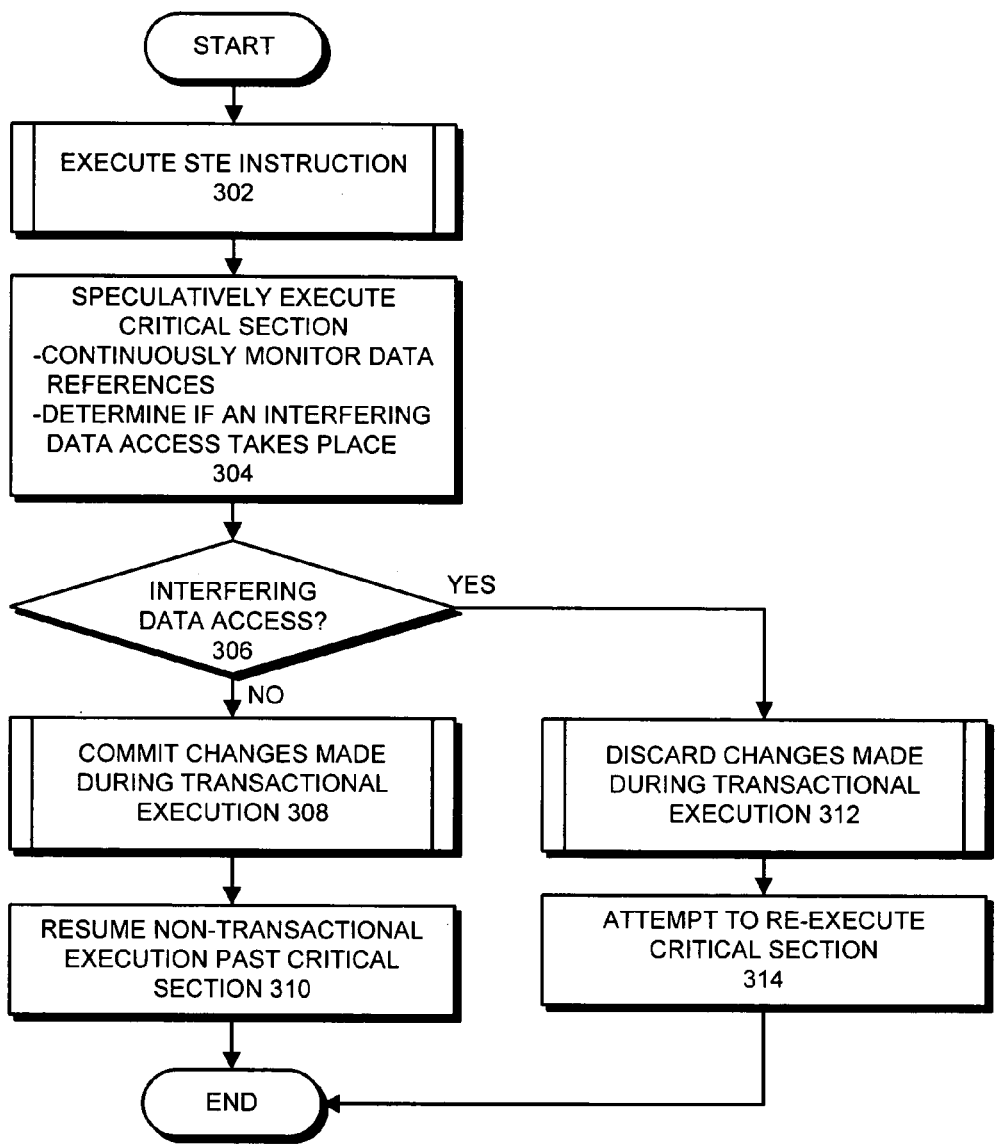
FIG. 3 presents a flow chart illustrating the transactional execution process in accordance with an embodiment of the present invention.

FIG. 3 presents a flow chart illustrating how transactional execution takes place in accordance with an embodiment of the present invention. A thread first executes an STE instruction prior to entering of a critical section of code (step 302). Next, the system transactionally executes code within the critical section, without committing results of the transactional execution (step 304).

During this transactional execution, the system continually monitors data references made by other threads, and determines if an interfering data access (or other type of failure) takes place during transactional execution. If not, the system atomically commits all changes made during transactional execution (step 308) and then resumes normal non-transactional execution of the program past the critical section (step 310).

On the other hand, if an interfering data access is detected, the system discards changes made during the transactional execution (step 312), and attempts to re-execute the critical section (step 314).

In one embodiment of the present invention, the system attempts to transactionally re-execute the critical section zero, one, two or more times. If these attempts are not successful, the system executes an alternative block of code in normal execution mode. This alternative code may additionally attempt to perform the transaction and will likely have the ability to revert back to the conventional technique of acquiring a lock on the critical section before entering the critical section, and then releasing the lock after leaving the critical section.

Note that an interfering data access can include a store by another thread to a cache line that has been load-marked by the thread. It can also include a load or a store by another thread to a cache line that has been store-marked by the thread.

Also note that circuitry to detect interfering data accesses can be easily implemented by making minor modifications to conventional cache coherence circuitry. This conventional cache coherence circuitry presently generates signals indicating whether a given cache line has been accessed by another processor. Hence, these signals can be used to determine whether an interfering data access has taken place.

Starting Transactional Execution

FIG. 4 presents a flow chart illustrating a start transactional execution (STE) operation in accordance with an embodiment of the present invention. This flow chart illustrates what takes place during step 302 of the flow chart in FIG. 3. The system starts by checkpointing the register file (step 402). This can involve performing a flash copy operation from register file 103 to register file 104 (see FIG. 1). In addition to checkpointing register values, this flash copy can also checkpoint various state registers associated with the currently executing thread. In general, the flash copy operation checkpoints enough state to be able to restart the corresponding thread.

At the same time the register file is checkpointed, the STE operation also causes store buffer 112 to become "gated" (step 404). This allows existing entries in store buffer to propagate to the memory sub-system (and to thereby become committed to the architectural state of the processor), but prevents new store buffer entries generated during transactional execution from doing so.

The system then starts transactional execution (step 406), which involves load-marking and store-marking cache lines, if necessary, as well as monitoring data references in order to detect interfering references.

Load-Marking Process

FIG. 5 presents a flow chart illustrating how load-marking is performed during transactional execution in accordance with an embodiment of the present invention. During transactional execution of a critical section, the system performs a load operation. In performing this load operation if the load operation has been identified as a load operation that needs to be load-marked, the system first attempts to load a data item from L1 data cache 115 (step 502). If the load causes a cache hit, the system "load-marks" the corresponding cache line in L1 data cache 115 (step 506). This involves setting the load-marking bit for the cache line. Otherwise, if the load causes a cache miss, the system retrieves the cache line from further levels of the memory hierarchy (step 508), and proceeds to step 506 to load-mark the cache line in L1 data cache 115.

Store-Marking Process

FIG. 6 presents a flow chart illustrating how store-marking is performed during transactional execution in accordance with an embodiment of the present invention. During transactional execution of a critical section, the system performs a store operation. If this store operation has been identified as a store operation that needs to be store-marked, the system first prefetches a corresponding cache line for exclusive use (step 602). Note that this prefetch operation will do nothing if the line is already located in cache and is already in an exclusive use state.

Since in this example L1 data cache 115 is a write-through cache, the store operation propagates through L1 data cache 115 to L2 cache 120. The system then attempts to lock the cache line corresponding to the store operation in L2 data cache 115 (step 604). If the corresponding line is in L2 cache 120 (cache hit), the system "store-marks" the corresponding cache line in L2 cache 120 (step 610). This involves setting the store-marking bit for the cache line. Otherwise, if the corresponding line is not in L2 cache 120 (cache miss), the system retrieves the cache line from further levels of the memory hierarchy (step 608) and then proceeds to step 610 to store-mark the cache line in L2 cache 120.

Next, after the cache line is store-marked in step 610, the system enters the store data into an entry of the store buffer 112 (step 612). Note that this store data will remain in store buffer 112 until a subsequent commit operation takes place, or until changes made during the transactional execution are discarded.

Note that a cache line that is store marked by a given thread can be read by other threads. Note that this may cause the given thread to fail while the other threads continue.

Commit Operation

Figures 7, 8:
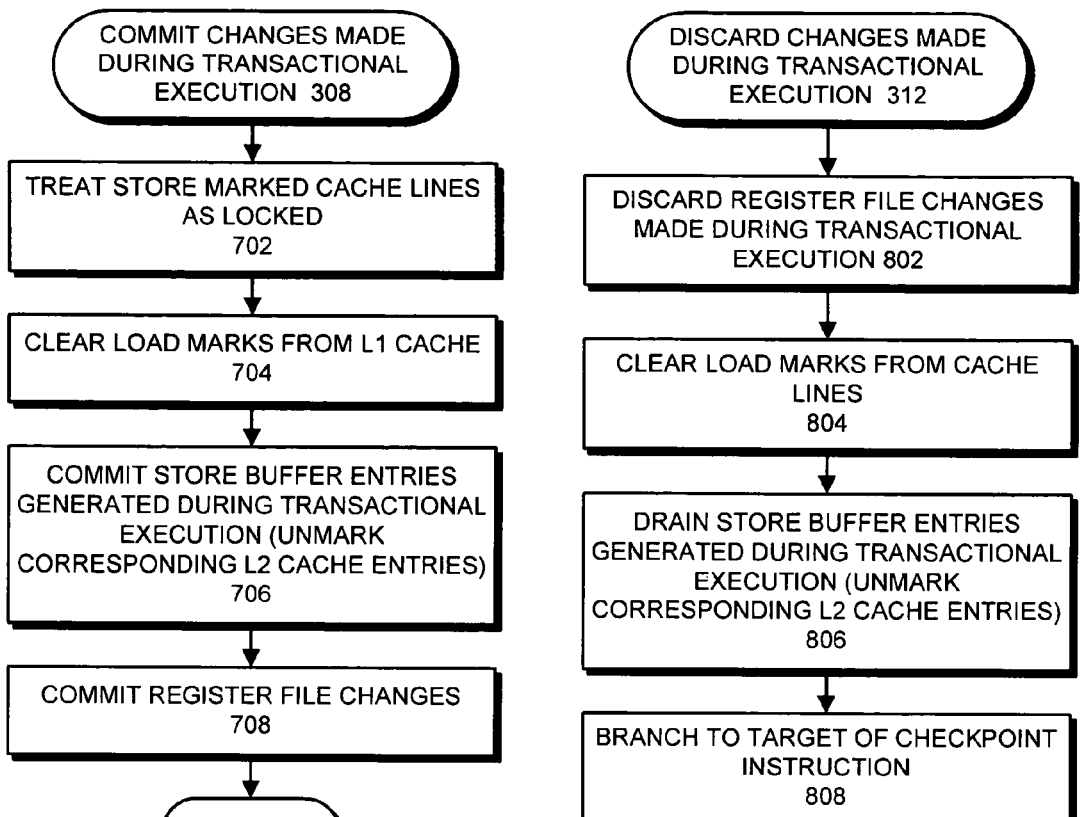
FIG. 7 presents a flow chart illustrating how a commit operation is performed in accordance with an embodiment of the present invention.
FIG. 8 presents a flow chart illustrating how changes are discarded after transactional execution completes unsuccessfully in accordance with an embodiment of the present invention.

FIG. 7 presents a flow chart illustrating how a commit operation is performed after transactional execution completes successfully in accordance with an embodiment of the present invention. This flow chart illustrates what takes place during step 308 of the flow chart in FIG. 3.

The system starts by treating store-marked cache lines as though they are locked (step 702). This means other threads that request a store-marked line must wait until the line is no longer locked before they can access the line. This is similar to how lines are locked in conventional caches.

Next, the system clears load-marks from L1 data cache 115 (step 704).

The system then commits entries from store buffer 112 for stores that are identified as needing to be marked, which were generated during the transactional execution, into the memory hierarchy (step 706). As each entry is committed, a corresponding line in L2 cache 120 is unlocked.

The system also commits register file changes (step 708). For example, this can involve functionally performing a flash copy between register file 103 and register file 104 in the system illustrated in FIG. 1.

Discarding Changes

FIG. 8 presents a flow chart illustrating how changes are discarded after transactional execution completes unsuccessfully in accordance with an embodiment of the present invention. This flow chart illustrates what takes place during step 312 of the flow chart in FIG. 3. The system first discards register file changes made during the transactional execution (step 802). This can involve either clearing or simply ignoring register file changes made during transactional execution. This is easy to accomplish because the old register values were checkpointed prior to commencing transactional execution. The system also clears load-marks from cache lines in L1 data cache 115 (step 804), and drains store buffer entries generated during transactional execution without committing them to the memory hierarchy (step 806). At the same time, the system unmarks corresponding L2 cache lines. Finally, in one embodiment of the present invention, the system branches to a target location specified by the STE instruction (step 808). The code at this target location optionally attempts to re-execute the critical section (as is described above with reference to step 314 of FIG. 1) or takes other action in response to the failure, for example backing off to reduce contention.

Monitored Load Instructions

Figure 9A:
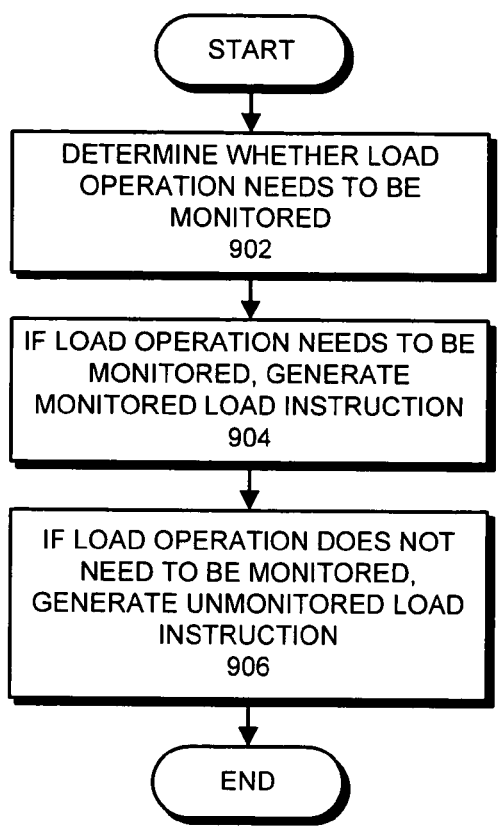
FIG. 9A presents a flow chart illustrating how monitored and unmonitored load instructions are generated in accordance with an embodiment of the present invention.

FIG. 9A presents a flow chart illustrating how monitored and unmonitored load instructions are generated in accordance with an embodiment of the present invention. This process takes place when a program is being generated to support transactional execution. For example, in one embodiment of the present invention, a compiler or virtual machine automatically generates native code to support transactional execution. In another embodiment, a programmer manually generates code to support transactional execution.

The system first determines whether a given load operation within a block of instructions to be transactionally executed needs to be monitored (step 902). In one embodiment of the present invention, the system determines whether a load operation needs to be monitored by determining whether the load operation is directed to a heap. Note that a heap contains data that can potentially be accessed by other threads. Hence, loads from the heap need to be monitored to detect interference. In contrast, loads from outside the heap, (for example, from the local stack) are not directed to data that is shared by other threads, and hence do not need to be monitored to detect interference.

One embodiment of the present invention determines whether a load operation needs to be monitored at the programming-language level, by examining a data structure associated with the load operation to determine whether the data structure is a "protected" data structure for which loads need to be monitored, or an "unprotected" data structure for which loads do not need to be monitored.

In yet another embodiment, the system allows a programmer to determine whether a load operation needs to be monitored.

If the system determines that a given load operation needs to be monitored, the system generates a "monitored load" instruction (step 904). Otherwise, the system generates an "unmonitored load" instruction (step 906).

There are a number of different ways to differentiate a monitored load instruction from an unmonitored load instruction. (1) The system can use the op code to differentiate a monitored load instruction from an unmonitored load instruction. (2) Alternatively, the system can use the address of the load instruction to differentiate between the two types of instructions. For example, loads directed to a certain range of addresses can be monitored load instructions, whereas loads directed to other address can be unmonitored load instructions.

Also note that an unmonitored load instruction can either indicate that no other thread can possibly interfere with the load operation, or it can indicate that interference is possible, but it is not a reason to fail. (Note that in some situations, interfering accesses to shared data can be tolerated.)

Figure 9B:
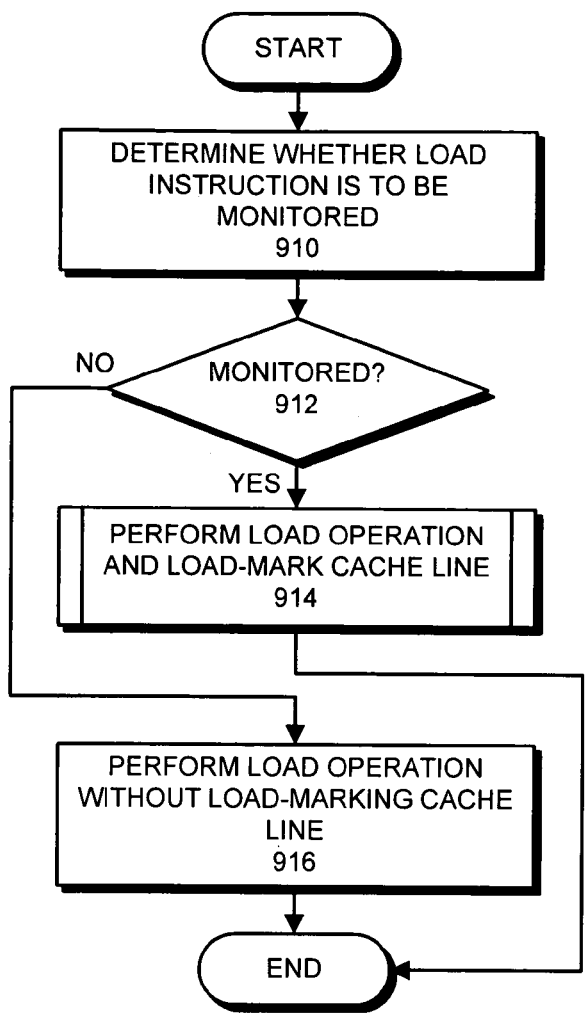
FIG. 9B presents a flow chart illustrating how monitored and unmonitored load instructions are executed in accordance with an embodiment of the present invention.

FIG. 9B presents a flow chart illustrating how monitored and unmonitored load instructions are executed in accordance with an embodiment of the present invention. The system first determines whether the load instruction is a monitored load instruction or an unmonitored load instruction (step 910). This can be accomplished by looking at the op code of the load instruction, or alternatively, looking at the address for the load instruction. Note that the address can be examined by comparing the address against boundary registers, or possibly examining a translation lookaside buffer (TLB) entry for the address to determine if the address falls within a monitored range of addresses.

If the load instruction is a monitored load instruction, the system performs the corresponding load operation and load marks the associated cache line (step 914). Otherwise, if the load instruction is an unmonitored load instruction, the system performs the load operation without load-marking the cache line (step 916).

In a variation of this embodiment, the system does not allow an unmarked load operation from the current thread to cause other threads to fail transactional execution. This can be accomplished by propagating additional information during the coherency transactions associated with the load operation to ensure that the load operation does not cause another thread to fail.

Monitored Store Instructions

Figure 10A:
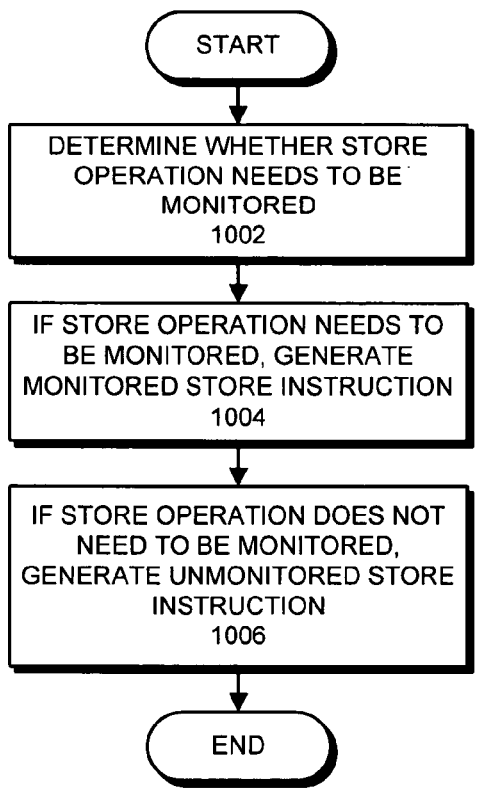
FIG. 10A presents a flow chart illustrating how monitored and unmonitored store instructions are generated in accordance with an embodiment of the present invention.

FIG. 10A presents a flow chart illustrating how monitored and unmonitored store instructions are generated in accordance with an embodiment of the present invention. As was described above for load operations, this process can take place when a compiler or virtual machine automatically generates native code to support transactional execution, or when a programmer manually generates code to support transactional execution.

The system first determines whether a store operation within a block of instructions to be transactionally executed needs to be monitored (step 1002). This determination can be made in the based on the same factors as for load instructions.

If the system determines that a store operation needs to be monitored, the system generates a "monitored store" instruction (step 1004). Otherwise, the system generates an "unmonitored store" instruction (step 1006).

Note that monitored store instructions can be differentiated from unmonitored store instructions in the same way that monitored load instructions can be differentiated from unmonitored load instructions, for example the system can use different op codes or different address ranges.

Figure 10B:
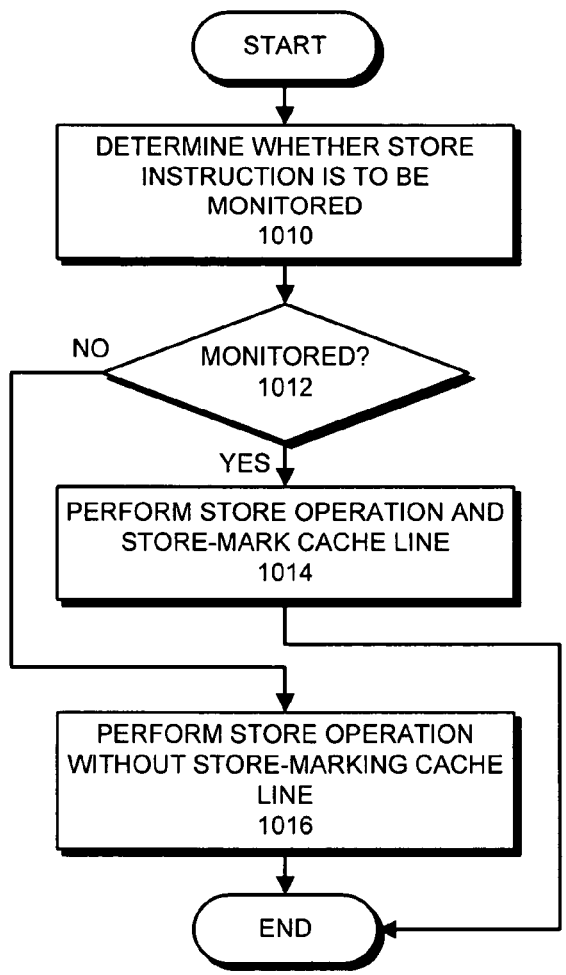
FIG. 10B presents a flow chart illustrating how monitored and unmonitored store instructions are executed in accordance with an embodiment of the present invention.

FIG. 10B presents a flow chart illustrating how monitored and unmonitored store instructions are executed in accordance with an embodiment of the present invention. The system first determines whether the store instruction is a monitored store instruction or an unmonitored store instruction (step 1010). This can be accomplished by looking at the op code for the store instruction, or alternatively, looking at the address for the store instruction. If the store instruction is a monitored store instruction, the system performs the corresponding store operation to a gated store buffer, or in another way so that it can be later undone, and store marks the associated cache line (step 1014). Otherwise, if the store instruction is an unmonitored store instruction, the system performs the store operation without store-marking the cache line (step 1016).

Note that a store-marked cache line can indicate one or more of the following: (1) loads from other threads to the cache line should be monitored; (2) stores from other threads to the cache line should be monitored; or (3) stores to the cache line should be buffered until the transactional execution completes.

In a variation of this embodiment, the system does not allow an unmarked store operation from the current thread cause another thread to fail transactional execution. This can be accomplished by propagating additional information during coherency transactions associated with the store operation to ensure that the store operation does not cause another thread to fail.

Load-Marking Process

Figure 11:
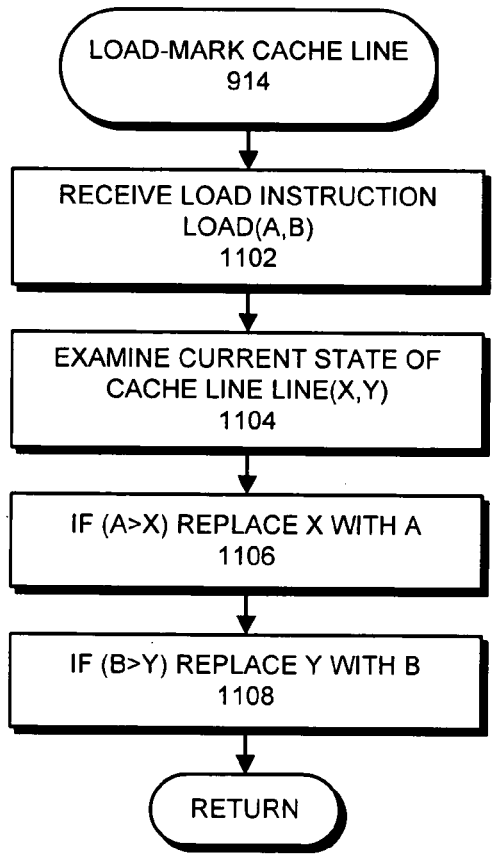
FIG. 11 presents a flow chart illustrating how a cache line is load-marked in accordance with an embodiment of the present invention.

FIG. 11 presents a flow chart illustrating how a cache line is load-marked in accordance with an embodiment of the present invention. This flow chart illustrates in more detail the load-marking operation performed in step 914 in FIG. 9 described above. First, the system receives a special load instruction LOAD(dest,addr,A,B) (step 1102). Like a normal load instruction, the special load specifies a destination register "dest" and a load address "addr". This load address can be used to identify a cache line that the load instruction is directed to. The special load instruction includes two additional parameters "A" and "B." The parameter A specifies the minimum number of "commit-and-start-new-transaction operations" the corresponding cache line will remain marked for, while the parameter B specifies the minimum number of "release operations" that the load instruction will remain marked for.

Note that a commit-and checkpoint operation commits the previous transactional execution operation and commences a new transactional execution operation in one atomic operation. In contrast, a release operation unmarks cache lines that have been specially load-marked during transactional execution. This enables load-marked cache lines to become unmarked during transactional execution. Note that A and B can be thought of as a generalization of the load-marking bit described above.

Next, the system examines the current state "LINE(X,Y)" of the cache line that the load operation is directed to (step 1104). This current state includes values X and Y, which correspond to parameters A and B in the load instruction, respectively. Hence, X indicates the number of "commit-and-start-new-transaction operations" the cache line will remain marked for, while Y specifies the number of "release operations" that the load instruction will remain marked for.

Next, the system modifies the current state of the cache line, if necessary, to reflect the A and B parameters of the load instruction. If A>X, the system replaces X with A (step 1106), and if B>Y, the system replaces Y with B (step 1108). In this way, the current state of the cache line is updated to reflect the maximum of A and X, and the maximum of B and Y. This means that a cache line will remain marked as long as any load instruction requires it to.

Note that the system still supports an unchecked load instruction, which does not load-mark cache lines. (This unmarked load instruction can be thought of as LOAD(0,0).) Furthermore, other variations of the load instruction are possible. In one embodiment of the present invention, the special load instruction only supports the parameter A, but not the parameter B. In another embodiment, the load instruction only supports the parameter B but not the parameter A. If the parameter A>0, then the parameter B does not matter, because if the load can survive until the next checkpoint-and-commit instruction, the load has to survive any release instructions up till the next checkpoint-and-commit operation.

Also note that it is possible for a cache line to be accessed multiple times within a transaction. For example, when we load a value that has already been stored to by this transaction, we need to get the value from the store buffer, not just do a regular load. Such loads do not cause a cache line that was store-marked to become load-marked. (Note that this problem does not arise if the store marks are in L2 and the load marks in L1).

Release Instruction

Figure 12:
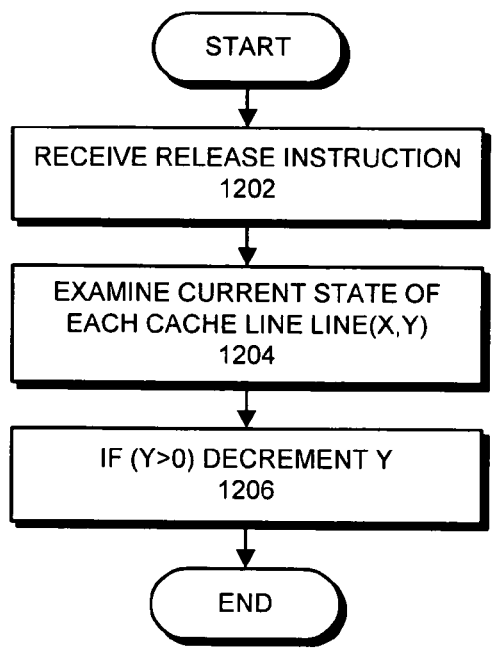
FIG. 12 presents a flow chart illustrating how a release instruction operates in accordance with an embodiment of the present invention.

FIG. 12 presents a flow chart illustrating how a release instruction operates in accordance with an embodiment of the present invention. First, the system receives a release instruction during transactional execution of a block of instructions within an application (step 1202). Next, the system examines the current state "LINE(X,Y)" of each cache line (step 1204). For each cache line, if Y>0, the system decrements Y (step 1206). Furthermore, if Y becomes zero and X is also zero, the line becomes unmarked.

Hence, the present invention allows a programmer (or compiler/interpreter) to generate special load instructions and periodic release instructions, which release load-marked cache lines from monitoring during transactional execution.

Unmarking load-marked cache lines has a number of benefits. For example, cache lines that are unmarked do not have to remain locked in cache memory until the transaction completes (or is killed), and false failures are less likely to occur due to a large number of cache lines being marked. (Note that when a large number of cache lines are marked, false failures are likely to occur when accesses that appear to interfere with each other do not actually touch the same data items in a cache line.)

Commit-And-Start-New-Transaction Instruction

Note that a commit-and-start-new-transaction instruction causes the current transactional execution to commit in the same way as if a normal commit instruction was encountered. All updates to register state and memory are performed. All store marks are cleared and some load marks are cleared as described. The difference between a normal commit and a commit-and-start-new-transactions instruction is that a commit-and-start-new-transaction instruction causes a new transaction to be immediately started (like executing a STE) with the additional behavior that the new transaction starts with some lines already load marked. This allows a line to be monitored across consecutive transactions.

Also, unlike a normal transaction, a transaction initiated with a commit-and-start-new-transaction instruction cannot be retried if an interfering operation causes it to fail. Instead, execution proceeds to an appropriate alternative code sequence, in normal execution mode, to complete the work in an appropriate way.

Figure 13:
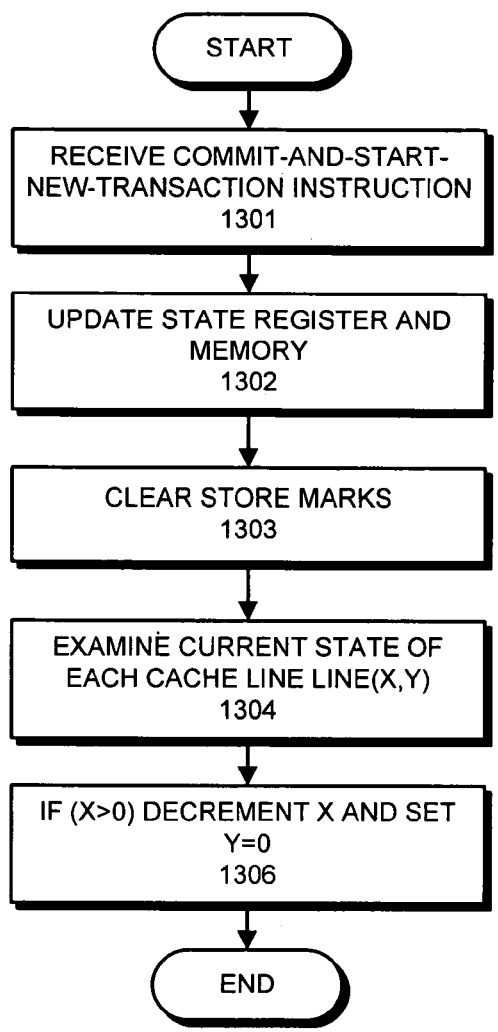
FIG. 13 presents a flow chart illustrating how a commit-and-start-new-transaction instruction operates in accordance with an embodiment of the present invention.

FIG. 13 presents a flow chart illustrating how a commit-and-start-new-transaction instruction operates in accordance with an embodiment of the present invention. First, the system receives a commit-and-start-new-transaction instruction during transactional execution of a block of instructions within an application (step 1301). Next, the system performs all relevant updates to the state register and to the memory (step 1302) and all associated store marks are cleared (step 1303). (Note that updates to memory can involve committing stores from the store buffer to memory, or at least "ungating" them so that they subsequently drain to memory.) Next, for the load marks, the system examines the current state "LINE(X,Y)" of each cache line (step 1304). For each cache line, if X>0, the system decrements X and sets Y=0 (step 1306). Note that if X becomes zero, the line becomes unmarked.

Hence, the present invention allows a programmer (or compiler/interpreter) to generate special load instructions and periodic commit-and-start-new-transaction instructions, which selectively release load-marked cache lines from monitoring during commit-and-start-new-transaction operations.

Regular Commit Instruction

Figure 14:
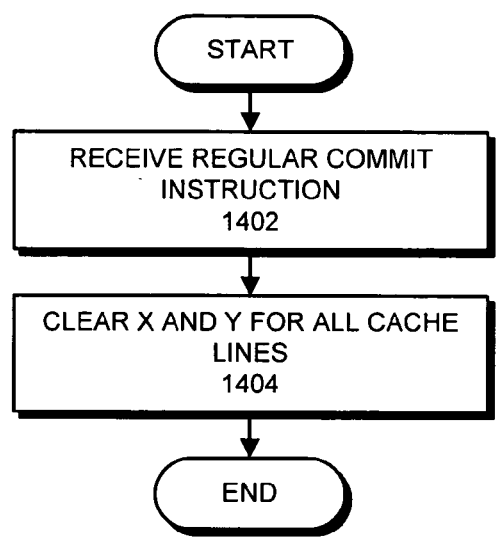
FIG. 14 presents a flow chart illustrating how a regular commit instruction operates in accordance with an embodiment of the present invention.

FIG. 14 presents a flow chart illustrating how a regular commit instruction (not a commit-and-start-new-transaction instruction) operates in accordance with an embodiment of the present invention. First, the system receives a regular commit instruction during transactional execution of a block of instruction in an application (step 1402). The system then clears the state variables X and Y in all cache lines. Unlike a commit-and-start-new-transaction operation, a regular commit operation terminates transactional execution and unmarks all cache lines so that no cache lines continue to be monitored.

Note that it is hard to check the state information for all cache lines in parallel during release operations. To remedy this problem, one embodiment of the present invention maintains a global counter that is incremented during each release operation. In this embodiment, the system marks cache lines by adding the value B to the global counter to produce a sum B' and then storing B' in the state variable Y if the state variable Y is greater than B'. In this embodiment, the cache lines remain "marked" until the global counter reaches or exceeds the value stored in the state variable Y. Note that if the state variable Y wraps around back to zero, it may cause a false failure during transactional execution. This can potentially degrade performance, however, the application will continue to operate correctly.

In another embodiment of the present invention, the system maintains a similar global counter that is incremented on every commit-and-start-new-transaction operation. In this embodiment, the system marks cache lines by adding the value A to the global counter to produce a sum A' and then storing A' in the state variable X if the state variable X is greater than A'. In this embodiment, the cache lines remain "marked" until the global counter reaches or exceeds the value stored in the state variable Y.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for selectively unmarking load-marked cache lines during transactional execution, wherein load-marked cache lines are monitored during transactional execution to detect interfering accesses from other threads, the method comprising:
   encountering a release instruction during transactional execution of a block of instructions within a program, wherein changes made during the transactional execution are not committed to the architectural state of a processor until the transactional execution completes without encountering an interfering data access from another thread; and
   in response to the release instruction, modifying the state of cache lines, which are specially load-marked to indicate they can be released from monitoring, to account for the release instruction being encountered;
   wherein modifying the specially load-marked cache lines can cause the specially load-marked cache lines to become unmarked.

2. The method of claim 1,
   wherein a specially load-marked cache line contains a release value indicating how many release instructions need to be encountered before the cache line can become unmarked;

wherein modifying the specially load-marked cache line involves decrementing the release value; and wherein if decrementing the release value causes the release value to become zero, the cache line becomes unmarked.

3. The method of claim 2, wherein decrementing release values for all specially load-marked cache lines involves incrementing a global counter, wherein release values are initialized with respect to the global counter.

4. The method of claim 1, wherein upon encountering a load instruction during the transactional execution, the method further comprises:

performing the corresponding load operation; and if the load instruction is a monitored load instruction, load-marking a corresponding cache line to facilitate subsequent detection of an interfering data access to the cache line from another thread;

wherein if the load instruction additionally specifies that the corresponding cache line can be released from monitoring during transactional execution, load-marking the cache line involves specially load-marking the cache line to indicate that the cache line can be released from monitoring after either an explicit or implicit number of release instructions have been encountered.

5. The method of claim 1, wherein if an interfering data access from another thread is encountered during transactional execution, the method further comprises:

discarding changes made during the transactional execution; and attempting to re-execute the block of instructions.

6. The method of claim 1, wherein if transactional execution completes without encountering an interfering data access from another thread, the method further comprises:

committing changes made during the transactional execution to the architectural state of a processor; and resuming normal non-transactional execution of the program past the block of instructions.

7. The method of claim 1, wherein an interfering data access can include:

a store by another thread to a cache line that has been load-marked by a thread; and a load or a store by another thread to a cache line that has been store-marked by the thread.

8. An apparatus that selectively unmarks load-marked cache lines during transactional execution, wherein load-marked cache lines are monitored during transactional execution to detect interfering accesses from other threads, the apparatus comprising:

an execution mechanism configured to execute a release instruction during transactional execution of a block of instructions within a program, wherein changes made during the transactional execution are not committed to the architectural state of a processor until the transactional execution completes without encountering an interfering data access from another thread; and an updating mechanism, wherein in response to the release instruction, the updating mechanism is configured to modify the state of cache lines, which are specially load-marked to indicate they can be released from monitoring, to account for the release instruction being encountered;

wherein while modifying the specially load-marked cache lines, the updating mechanism can cause the specially load-marked cache lines to become unmarked.

9. The apparatus of claim 8, wherein a specially load-marked cache line contains a release value indicating how many release instructions need to be encountered before the cache line can become unmarked;

wherein while modifying the specially load-marked cache line, the updating mechanism is configured to decrement the release value; and wherein if decrementing the release value causes the release value to become zero, the cache line becomes unmarked.

10. The apparatus of claim 9, wherein decrementing release values for all specially load-marked cache lines involves incrementing a global counter, wherein release values are initialized with respect to the global counter.

11. The apparatus of claim 8, further comprising a load-marking mechanism, wherein upon encountering a load instruction during the transactional execution, the load-marking mechanism is configured to:

perform the corresponding load operation; and if the load instruction is a monitored load instruction, to load-mark a corresponding cache line to facilitate subsequent detection of an interfering data access to the cache line from another thread;

wherein if the load instruction additionally specifies that the corresponding cache line can be released from monitoring during transactional execution, the load-marking mechanism is configured to specially load-mark the cache line to indicate that the cache line can be released from monitoring after either an explicit or implicit number of release instructions have been encountered.

12. The apparatus of claim 8, wherein if an interfering data access from another thread is encountered during transactional execution, the execution mechanism is configured to:

discard changes made during the transactional execution; and to attempt to re-execute the block of instructions.

13. The apparatus of claim 8, wherein if transactional execution completes without encountering an interfering data access from another thread, the execution mechanism is configured to:

commit changes made during the transactional execution to the architectural state of the processor; and to resume normal non-transactional execution of the program past the block of instructions.

14. The apparatus of claim 8, wherein an interfering data access can include:

a store by another thread to a cache line that has been load-marked by a thread; and a load or a store by another thread to a cache line that has been store-marked by the thread.

15. A method for selectively unmarking load-marked cache lines during transactional execution, wherein load-marked cache lines are monitored during transactional execution to detect interfering accesses from other threads, the method comprising:

encountering a commit-and-start-new-transaction instruction during transactional execution of a block of instructions within a program, wherein changes made during the transactional execution are not committed to the architectural state of a processor until the transactional execution completes without encountering an interfering data access from another thread; and in response to the commit-and-start-new-transaction instruction, modifying load-marked cache lines to account for the commit-and-start-new-transaction instruction being encountered;

wherein modifying the load-marked cache lines causes normally load-marked cache lines to become unmarked, while other specially load-marked cache lines may remain load-marked past the commit-and-start-new-transaction instruction;

whereby a new transaction can be immediately started with some cache lines already load-marked, thereby allowing a cache line to be monitored across consecutive transactions.

16. The method of claim 15, wherein a specially load-marked cache line contains a checkpoint value indicating how many checkpoint-and-commit instructions need to be encountered before the cache line can become unmarked;

wherein modifying the specially load-marked cache line involves decrementing the checkpoint value; and wherein if decrementing the checkpoint value causes the checkpoint value to become zero, the cache line becomes unmarked.

17. The method of claim 16, wherein decrementing release values for all specially load-marked cache lines involves incrementing a global counter, wherein release values are initialized with respect to the global counter.

18. The method of claim 15, wherein upon encountering a load instruction during the transactional execution, the method further comprises:

performing the corresponding load operation; and if the load instruction is a monitored load instruction, load-marking a corresponding cache line to facilitate subsequent detection of an interfering data access to the cache line from another thread;

wherein if the load instruction additionally specifies that multiple checkpoint-and-commit instructions need to be encountered before the cache line can become unmarked, and load-marking the cache line involves specially load-marking the cache line to indicate that multiple checkpoint-and-commit instructions need to be encountered before the cache line can become unmarked.

19. The method of claim 15, wherein if an interfering data access from another thread is encountered during transactional execution, the method further comprises:

determining if the transactional execution was initiated by a commit-and-start-new-transaction, and if so executing alternative code to complete the transactional execution in the presence of the interfering data access; and otherwise, discarding changes made during the transactional execution, and attempting to re-execute the block of instructions.

20. The method of claim 15, wherein if transactional execution completes without encountering an interfering data access from another thread, the method further comprises:

committing changes made during the transactional execution to the architectural state of the processor; and resuming normal non-transactional execution of the program past the block of instructions.

21. The method of claim 15, wherein an interfering data access can include:

a store by another thread to a cache line that has been load-marked by a thread; and a load or store by another thread to a cache line that has been store-marked by the thread.

22. An apparatus that selectively unmarks load-marked cache lines during transactional execution, wherein load-marked cache lines are monitored during transactional execution to detect interfering accesses from other threads, the apparatus comprising:

an execution mechanism configured to execute a commit-and-start-new-transaction instruction during transactional execution of a block of instructions within a program, wherein changes made during the transactional execution are not committed to the architectural state of a processor until the transactional execution completes without encountering an interfering data access from another thread; and an updating mechanism, wherein in response to the commit-and-start-new-transaction instruction, the updating mechanism is configured to modify load-marked cache lines to account for the commit-and-start-new-transaction instruction being encountered;

wherein while modifying the load-marked cache lines, the updating mechanism can cause normally load-marked cache lines to become unmarked, while other specially load-marked cache lines may remain load-marked past the commit-and-start-new-transaction instruction;

whereby a new transaction can be immediately started with some cache lines already load-marked, thereby allowing a cache line to be monitored across consecutive transactions.

23. The apparatus of claim 22, wherein a specially load-marked cache line contains a checkpoint value indicating how many checkpoint-and-commit instructions need to be encountered before the cache line can become unmarked;

wherein while modifying the specially load-marked cache line, the updating mechanism is configured to decrement the checkpoint value; and wherein if decrementing the checkpoint value causes the checkpoint value to become zero, the cache line becomes unmarked.

24. The apparatus of claim 23, wherein decrementing release values for all specially load-marked cache lines involves incrementing a global counter, wherein release values are initialized with respect to the global counter.

25. The apparatus of claim 22, further comprising a load-marking mechanism, wherein upon encountering a load instruction during the transactional execution, the load-marking mechanism is configured to:

perform the corresponding load operation; and if the load instruction is a monitored load instruction, to load-mark a corresponding cache line to facilitate subsequent detection of an interfering data access to the cache line from another thread;

wherein if the load instruction additionally specifies that multiple checkpoint-and-commit instructions need to be encountered before the cache line can become unmarked, the load-marking mechanism is configured to load-mark the cache line to indicate that multiple checkpoint-and-commit instructions need to be encountered before the cache line can become unmarked.

26. The apparatus of claim 22, wherein if an interfering data access from another thread is encountered during transactional execution, the execution mechanism is configured to:

determine if the transactional execution was initiated by a commit-and-start-new-transaction, and if so to execute alternative code to complete the transactional execution in the presence of the interfering data access; and otherwise, to discard changes made during the transactional execution, and to attempt to re-execute the block of instructions.

27. The apparatus of claim 22, wherein if transactional execution completes without encountering an interfering data access from another thread, the execution mechanism is configured to:

commit changes made during the transactional execution to the architectural state of the processor; and to resume normal non-transactional execution of the program past the block of instructions.

28. The apparatus of claim 22, wherein an interfering data access can include:

a store by another thread to a cache line that has been load-marked by a thread; and a load or a store by another thread to a cache line that has been store-marked by the thread.

* * * * *